US008587585B2

(12) United States Patent
Munkberg et al.

(10) Patent No.: US 8,587,585 B2
(45) Date of Patent: Nov. 19, 2013

(54) BACKFACE CULLING FOR MOTION BLUR AND DEPTH OF FIELD

(75) Inventors: Carl J. Munkberg, Malmö (SE); Tomas G. Akenine-Möller, Lund (SE); Marco Salvi, San Francisco, CA (US); Robert M. Toth, Lund (SE); Jon N. Hasselgren, Bunkeflostrand (SE); Franz P. Clarberg, Lund (SE); Matt Pharr, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 12/891,898

(22) Filed: Sep. 28, 2010

(65) Prior Publication Data

US 2012/0075304 A1    Mar. 29, 2012

(51) Int. Cl.
*G06T 15/40* (2011.01)

(52) U.S. Cl.
USPC .............................. 345/421; 345/419; 345/473

(58) Field of Classification Search
None
See application file for complete search history.

(56) References Cited

U.S. PATENT DOCUMENTS

| 5,929,862 | A | * | 7/1999 | Barkans | 345/613 |
| 6,057,848 | A | * | 5/2000 | Goel | 345/423 |
| 6,559,844 | B1 | | 5/2003 | Alamparambil | |
| 7,253,816 | B2 | * | 8/2007 | Brkic | 345/441 |
| 7,952,588 | B2 | | 5/2011 | Jiao | |
| 2010/0097377 | A1 | | 4/2010 | Hasselgren et al. | |

FOREIGN PATENT DOCUMENTS

EP    1542167    6/2005

OTHER PUBLICATIONS

PCT/US2011/053384 International Search Report with Written Opinion of the International Searching Authority mailed Apr. 12, 2012 (8 pgs).
Gribel, C. J., Doggett, M., and Akenine-Moller, T. 2010. Analytical Motion Blur Rasterization with Compression. In High Performance Graphics, 163-172.
McCool, M. D., Wales, C., and Moule, K. 2002. Incremental and Hierarchical Hilbert Order Edge Equation Polygon Rasterization. In Graphics Hardware, 65-72.
Olano, M., and Greer, T. 1997. Triangle Scan Conversion using 2D Homogeneous Coordinates. In Graphics Hardware, 89-95.

* cited by examiner

*Primary Examiner* — Said Broome
(74) *Attorney, Agent, or Firm* — Trop, Pruner & Hu, P.C.

(57) ABSTRACT

In order to efficiently backface cull rendering primitives during computer graphics rendering, it is important to be sure that the rendering primitives to be culled are guaranteed to be backfacing even if the primitives are moving or are undergoing defocus blur. Therefore, we derive conservative tests that determine if a moving and defocused triangle is backfacing over an entire time interval and over the area of a lens. In addition, we present tests for the special cases of only motion blur and only depth of field.

26 Claims, 4 Drawing Sheets

BACKFACE CULLING FOR MOTION BLUR AND DEPTH OF FIELD

BACKGROUND

This relates to graphics processing and, particularly, to motion blur and depth of field rendering.

Motion blur is the effect where moving objects appear blurred when captured with long camera exposure times. Depth of field is the effect that a larger aperture has a shorter focus range, and objects out of focus appear blurred.

One of the most important culling tests is backface culling. Backface culling eliminates rasterization processing of objects that face away from the camera. A rendering primitive can be backface culled if its face normal makes an angle of more than 90 degrees with the camera view vector. By culling these rendering primitives, unnecessary processing may be reduced.

When rendering motion blur and depth of field, an excessive amount of inside or intersection tests can be generated, and therefore, accurate backface culling tests are needed also for these contexts. For moving triangles, where each vertex moves along a line in three dimensions, a moving triangle is commonly assumed to be backfacing over the entire time interval if the triangle is backfacing at the start of the motion and at the end.

DETAILED DESCRIPTION

Figure 1:
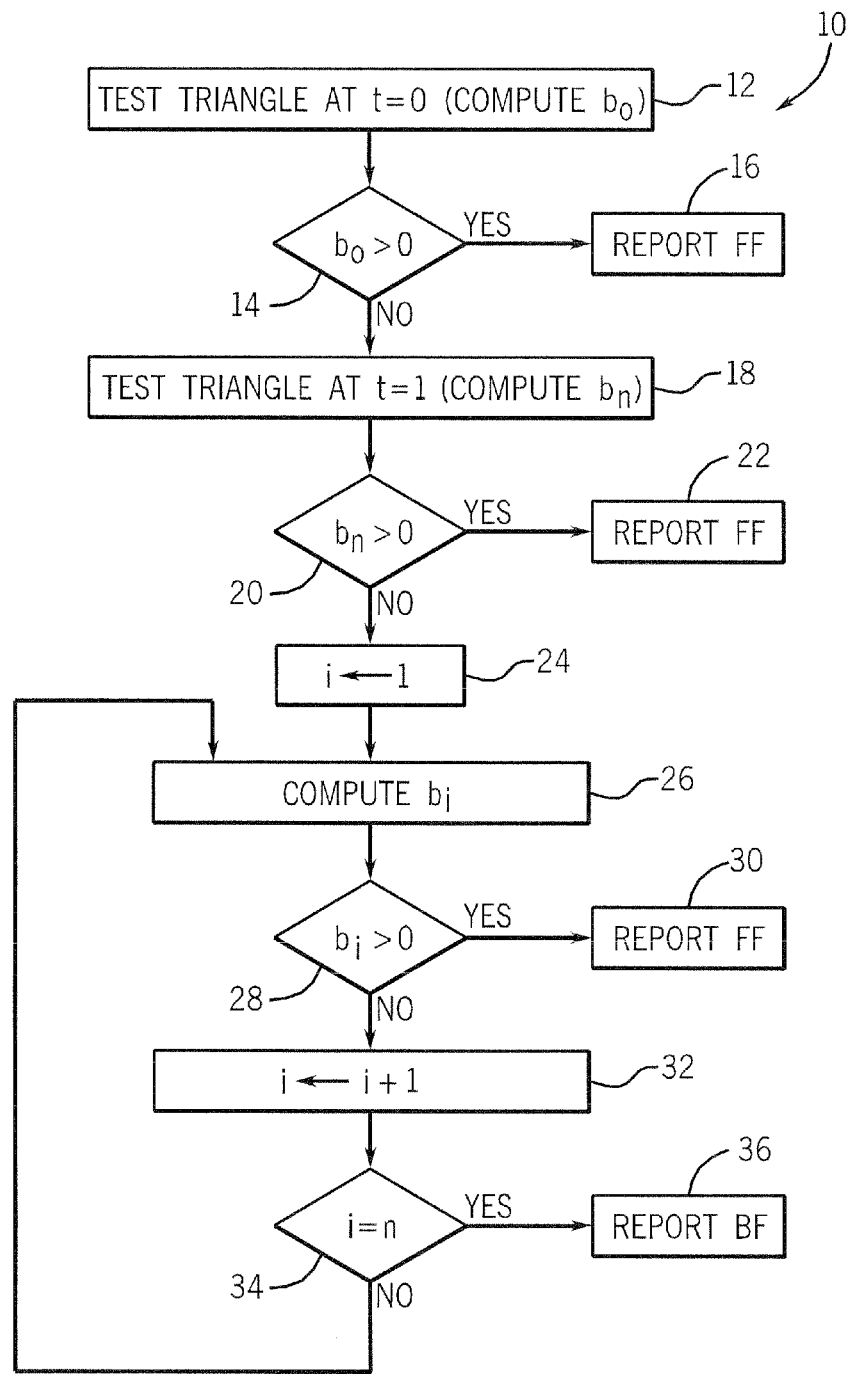
FIG. 1 is a flow chart for one embodiment.

A triangle where each vertex moves linearly in 3D can be backfacing (i.e. facing away from the camera) at the start of the motion (at $t=0$), then turn frontfacing, and then (again) backfacing at the end of the motion (at $t=1$). As a result, the assumption that a triangle whose vertices move linearly in time, is backfacing if the backfacing status is true at the start and end of the interval, is not always correct.

Assume that we have a moving triangle, where the vertices move linearly within a frame, from time $t=0$ to $t=1$. At $t=0$, we denote the vertices $q_i$ and at $t=1$ we call them $r_i$. We work in clip space, using 2D homogeneous coordinates (2DH), so a vertex is defined as $p=(p_x,p_y,p_w)$. A linearly interpolated vertex is then expressed as:

$$p_i(t)=(1-t)q_i+tr_i. \quad (1)$$

Given a moving triangle with vertices $(p_0(t),p_1(t),p_2(t))$, we form the matrix:

$$M(t) = \begin{bmatrix} p0_x & p1_x & p2_x \\ p0_y & p1_y & p2_y \\ p0_w & p1_w & p2_w \end{bmatrix}, \quad (2)$$

where we have omitted the temporal dependence for readability. The triangle can be backface culled if $\det(M)<0$, where the determinant is expressed as:

$$\det(M)=p_0 \cdot (p_1 \times p_2). \quad (3)$$

Geometrically, this can be interpreted as a (scaled) signed volume computation of the tetrahedron spanned by the origin and the triangle. Thus, we want to determine if $p_0(t) \cdot (p_1(t) \times p_2(t)) < 0$ for $t \in [0,1]$. The cross product of two linearly moving vertices can be expanded as:

$$p_1 \times p_2 = ((1-t)q_1+tr_1) \times ((1-t)q_2+tr_2) = t^2 f + tg + h, \quad (4)$$

where:

$$f=(r_1-q_1) \times (r_2-q_2),$$

$$g=(r_1-q_1) \times q_2 - (r_2-q_2) \times q_1,$$

$$h=q_1 \times q_2. \quad (5)$$

Using this expression, we can derive the time-dependent determinant:

$$\det(M) = p_0(t) \cdot (p_1(t) \times p_2(t)) \quad (6)$$
$$= ((1-t)q_0 + tr_0) \cdot (t^2 f + tg + h)$$
$$= at^3 + bt^2 + ct + d,$$

where:

$$a=(r_0-q_0) \cdot f,$$

$$b=(r_0-q_0) \cdot g + q_0 \cdot f,$$

$$c=(r_0-q_0) \cdot h + q_0 \cdot g,$$

$$d=q_0 \cdot h. \quad (7)$$

Note that the coefficient $d=q_0 \cdot h=q_0 \cdot (q_1 \times q_2)$ is the backface test for the triangle at $t=0$. Also, the value of the polynomial at $t=1$ is $a+b+c+d=r_0 \cdot (r_1 \times r_2)$, which, analogously, is the backface test at $t=1$. Finally, note that the expression for the coefficient:

$$a=(r_0-q_0)[(r_1-q_1) \times (r_2-q_2)], \quad (8)$$

is the determinant test for the motion vectors of the three vertices, and if they all lie in the same plane, the cubic term is zero, i.e., $a=0$. Thus, it is only when the motion vectors span a volume in 2DH that the determinant will be a cubic function.

We note that if the polynomial does not have any roots in $t \in [0,1]$ and $d<0$, then the triangle can be safely backface culled. Given that the backface function is below zero at $t=0$ and $t=1$, we can compute the local minimum and maximums of the cubic polynomial, and if we find a local maximum within the interval $t \in [0,1]$, we check the value of the cubic polynomial at this point. If it is below zero, we can safely backface cull the triangle. If the motion direction of the three vertices are parallel, the backfacing function is linear.

The coefficient a is the determinant of the triangle's three motion vectors, which are often small or near parallel. Therefore, directly computing the backfacing function on power form (Equation 6) can be numerically unstable. To alleviate this problem, we express the backfacing function on cubic Bernstein form:

$$b(t) = \sum_{i=0}^{3} b_i \binom{3}{i} (1-t)^{3-i} t^i, \quad (9)$$

with coefficients, $b_i$, given by:

$$b_0=q_0 \cdot (q_1 \times q_2)$$

$$b_1=\tfrac{1}{3}[q_0 \cdot (q_1 \times r_2) + r_1 \times q_2) + r_0 \cdot (q_1 \times q_2)],$$

$$b_2 = \frac{1}{3}[r_0 \cdot (q_1 \times r_2 + r_1 \times q_2) + q_0 \cdot (r_1 \times r_2)],$$

$$b_3 = r_0 \cdot (r_1 \times r_2). \tag{10}$$

Next, we exploit the convex hull property of the Bernstein basis, and simply check if any of the coefficients, $b_i$, $i \in \{0, 1, 2, 3\}$, are positive. This is a coarser test than testing against the true maximum of the cubic polynomial, but reduces the risk of numerical precision issues. Note that the test can be refined by applying de Casteljau steps to the coefficients and testing the generated coefficients.

A backface test for motion blur on Bernstein form, shown in FIG. 1, begins by testing a triangle at t=0 by computing $b_0$ (block 12). A check at diamond 14 determines whether $b_0$ is positive. If so, the triangle is front facing (block 16). Otherwise, the triangle is tested at t=1 by computing $b_n$ (block 18). If $b_n$ is positive, then the triangle is front facing (block 22). Otherwise, begin a loop by putting the value 1 into i (block 24), and computing $b_i$ (block 26). A check at diamond 28 determines if $b_i$ is positive. If so, it is front facing (block 30). If not, iterate until i equals n (block 32 and diamond 34) and then report the triangle as backfacing (block 36).

We sketch a practical implementation of the backface culling test for triangles where each vertex moves linearly in time in the pseudo code:

```
1    movingTriIsBackfacing(const TimeContTri& tri) {
2        b0 = det(M(t=0))
3        if b0 > 0
4            return false
5        b3 = det(M(t=1))
6        if b3 > 0
7            return false
8        compute b1
9        if b1 > 0
10           return false
11       compute b2
12       if b2 > 0
13           return false
14       return true
15   }
```

If the triangle vertex motion can be expressed as a polynomial, we can generalize the previous test. We express the motion of each triangle vertex as a Bézier curve of degree n in 2DH:

$$p_i(t) = \sum_{j=0}^{n} b_j^i B_j^n(t) \tag{11}$$

The backface test then becomes:

$$\det(M(t)) = p_0(t) \cdot (p_1(t) \times p_2(t)) \tag{12}$$

$$= \sum_{i=0}^{n} b_i^0 B_i^n(t) \cdot \left( \sum_{j=0}^{n} b_j^1 B_j^n(t) \times \sum_{k=0}^{n} b_k^2 B_k^n(t) \right)$$

$$= \sum_{i,j,k=0}^{n} B_i^n(t) B_j^n(t) B_k^n(t) b_i^0 \cdot (b_j^1 \times b_k^2)$$

$$= \sum_{i,j,k=0}^{n} B_{i+j+k}^{3n} \frac{\binom{n}{i}\binom{n}{j}\binom{n}{k}}{\binom{3n}{i+j+k}} b_i^0 \cdot (b_j^1 \times b_k^2).$$

Note that this is a Bézier curve of degree 3n, where the control points are sums of scaled determinants of three control points, one from each of the three curves describing the vertex motion. A conservative backface test can again be derived by using the convex hull property. As expected, we obtain Equation 10 for the linear motion case, i.e., when n=1. A similar derivation can be performed for rational splines.

The test has potential to speed up motion blur rasterization of macro-sized triangles, or small triangles with large motion, where one expensive backface culling test can be amortized over a lot of saved inside tests. If the number of inside tests is small in relation to the overhead of the conservative backface culling test, it may be better to skip the conservative test entirely, as backfacing triangles will be correctly culled in the per-sample inside test. Depending on the workload, the test could be enabled when the triangle sizes or the motion surpasses a threshold value.

Depth of field is a shear in clip space. This shear can be represented by applying the matrix:

$$S(u, v) = \begin{pmatrix} 1 & 0 & -Hu/J & Hu \\ 0 & 1 & -Iv/J & Iv \\ 0 & 0 & 1 & 0 \\ 0 & 0 & 0 & 1 \end{pmatrix}, \tag{13}$$

to the clip space coordinates of the triangle. H, I and J are constants given by the location of the focal plane, the camera aperture size and the near and far plane. The location on the lens is given by (u,v). Applying this matrix to a the three-dimensional homogeneous vertex (3DH), $\hat{p}_i = (p_{ix}, p_{iy}, p_{iz}, p_{iw})$, in clip space results in a sheared position, $\hat{s}_i(u,v)$:

$$s_{ix} = p_{ix} - H/Jup_{iz} + Hup_{iw} = p_{ix} + \alpha_i u,$$

$$s_{iy} = p_{iy} - I/Jvp_{iz} + Ivp_{iw} = p_{iy} + \beta_i v,$$

$$s_{iz} = p_{iz},$$

$$s_{iw} = p_{iw} \tag{14}$$

where $\alpha_i = H/Jp_{iz} + Hp_{iw}$ and $\beta_i = I/Jp_{iz} + Ip_{iw}$ are per-vertex values dependent on the $p_{iz}$ and $p_{iw}$ terms. To simplify notation below, we let $s_i(u,v)$ and $p_i(u,v)$ denote the two-dimensional homogeneous vertices, consisting of the xyw components of $\hat{s}_i(u,v)$ and $\hat{p}_i$ respectively, that is:

$$s_i(u,v) = p_i + (\alpha_i u, \beta_i v, 0) = p_i + l_i(u,v) \tag{15}$$

Note that:

$$l_i \times l_j = uv(0, 0, \alpha_i \beta_j - \alpha_j \beta_i) = 0 \tag{16}$$

since $$\alpha_i = \frac{H}{I} \beta_i.$$

The backfacing criterion then becomes:

$$\det(M(u, v)) = s_0 \cdot (s_1 \times s_2), \quad (17)$$
$$= p_0 \cdot (p_1 \times p_2) + 1_0 \cdot (p_1 \times p_2) + 1_1 \cdot (p_2 \times p_0) +$$
$$1_2 \cdot (p_0 \times p_1),$$
$$= au + bv + c.$$

The coefficients are given by:

$$a = \alpha_0(p_1 \times p_2)_x + \alpha_1(p_2 \times p_0)_x + \alpha_2(p_0 \times p_1)_x,$$

$$b = \beta_0(p_1 \times p_2)_y + \beta_1(p_2 \times p_0)_y + \beta_2(p_0 \times p_1)_y,$$

$$c = p_0 \cdot (p_1 \times p_2). \quad (18)$$

We note that some expressions for a and b can be reused for the edge equation setup. As can be seen, the backfacing function for depth of field is a linear function in u and v (Equation 17). The triangle changes its facing when $au+bv+c=0$. Hence, the triangle will change its facing somewhere on the lens only if there is a solution to the following system of equations:

$$au+bv+c=0,$$
$$u^2+v^2<R^2, \quad (19)$$

where the last equation checks whether the lens position, (u,v), is inside a circular lens with radius, R. Geometrically, this is an intersection between a circle and a line, which has a solution only if:

$$\frac{c^2}{a^2+b^2} < R^2. \quad (20)$$

Consequently, if we can prove that the above does not hold, there are no face changes when moving over the lens. Intuitively, the triangle will not change facing over the lens if the triangle's plane equation (in three dimensions) does not intersect with the shape of the lens.

Finally, note that if the triangle's face normal is aligned with the view vector, we have $p_{iz}=p_{jz}$ and $p_{iw}=p_{jw}$, and therefore $\alpha_i=\alpha_j$ and $\beta_i=\beta_j$, which leads to $a=b=0$. This means that facing will not change over the lens, as expected.

Figure 2:
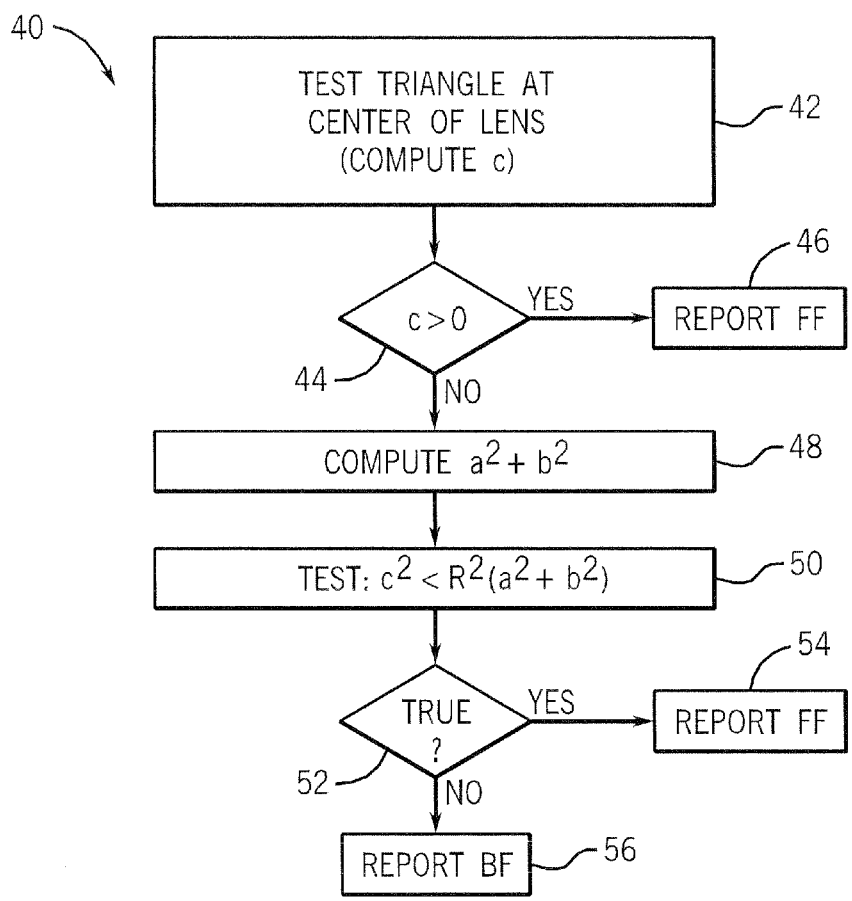
FIG. 2 is a flow chart for another embodiment.

To determine if a static triangle can be backface culled, we start with computing the backface status at the at the middle of the lens (u=v=0), FIG. 2, block 42. If c>0 (FIG. 2, diamond 44), the triangle may be frontfacing for some time at the center of the lens, and therefore our test is terminated since the triangle is not (conservatively) backfacing for all lens positions (FIG. 2, block 46). Otherwise, compute $a^2+b^2$ (FIG. 2, block 48) and test whether $c^2<R^2(a^2+b^2)$ (block 50 and diamond 52). That is, the triangle can be conservatively backface culled (FIG. 2, block 56) when:

$$c<0,$$

and $$c^2 \geq R^2(a^2+b^2) \quad (21)$$

Otherwise, the triangle is front facing (block 54).

By multiplying the moving vertex in Equation 1 with the shear matrix, S, in Equation 13, the resulting vertex displacement from motion and depth of field, o(u,v,t), is obtained:

$$o_i(u, v, t) = S(u, v)p_i(t) \quad (22)$$
$$= S(u, v)((1-t)q_i + tr_i),$$
$$= (p_{ix}(t) + \alpha_i(t)u, p_{iy}(t) + \beta_i(t)v, p_{iw}(t)),$$

where $\alpha_i(t)=H/Jp_{iz}(t)+Hp_{iw}(t)$ and $\beta_i(t)=I/Jp_{iz}(t)+Ip_{iw}(t)$ are linear functions in t.

The corresponding backface test from Equation 21 is now expressed as:

$$\det(M(u, v, t)) = o_0 \cdot (o_1 \times o_2) \quad (23)$$
$$= a(t)u + b(t)v + c(t).$$

The coefficients a(t), b(t), and c(t) are cubic functions in t. The triangle can be conservatively backface culled when:

$$c(t)<0, t\in[0,1]$$

and $$c^2(t)>R^2(a^2(t)+b^2(t)), t\in[0,1]. \quad (24)$$

Otherwise, the triangle is front facing (block 54).

A conservative test can be obtained by using interval arithmetic. We denote an interval as $\hat{x}=[\underline{x},\overline{x}]$, where $\underline{x}$ is its lower bound and $\overline{x}$ is the upper boundary. The idea is then to minimize the expression to the left of the greater than sign in Equation 24, and to maximize the expression to the right. This results in:

$$\overline{c}^2 R^2(\max(\underline{a}^2,\overline{a}^2)+\max(b\underline{b}^2,\overline{b}^2)), \quad (25)$$

where we used $\overline{c}<0 \Rightarrow \min(\underline{c}^2,\overline{c}^2)=\overline{c}^2$. So, if $\overline{c}<0$ and Equation 25 hold, the triangle, moving in time and over the lens, can be conservatively backface culled. The cubic polynomials a(t), b(t) and c(t) can be converted from power form to Bernstein form, and then we use the convex hull property of the Bernstein control points for conservative culling, similar to what we did previously for motion blurred primitives.

If we approximate the lens with a square with side length R, we get a coarser test given by the equations:

$$au+bv+c=0,$$
$$|u|<R, |v|<R, \quad (26)$$

which is a line against box test. Again, we start by testing whether $\hat{c}<0$, i.e., whether the triangle is backfacing on the center of the lens. Then, if the four corners of the (square) lens all are on the same side of the swept line, we can conservatively cull the triangle. These four conditions are given by:

$$\max(\pm R(a\pm b)\pm c)<0. \quad (27)$$

Note that the expressions a, b and c are cubic polynomials in t. Unlike the interval analysis test given for the circular lens, we can, for each of the four equations, compute the coefficients for a single cubic equation and bound it, therefore retaining the correlation between the power coefficients for tighter bounds. This may be more efficient for motion with large non-linear coefficients.

Next, we sketch a practical implementation of the backface culling test for motion blurred and defocused triangles. We first note that a coarse, but fast approximation of $a^2(t)+b^2(t)$ is given by:

$$\max(a^2+b^2) \leq \max(\underline{a}^2,\overline{a}^2)+\max(\underline{b}^2,\overline{b}^2), \quad (28)$$

which essentially is a Manhattan distance approximation.

However, we will instead bound the cubic functions using first-order Taylor models, since the correlation in the linear terms can be preserved, which in turn can give tighter bounds. We also note that the $t^3$ and $t^2$ terms of the polynomial a(t) and b(t) are very close to zero for most triangles. This implies that the a(t), b(t) and c(t) terms in Equation 23 are approximately linear, but it also means that care must be taken to avoid precision issues. By using first-order Taylor models, we ensure stability when the $t^3$ and $t^2$ terms are small. For an arbitrary cubic polynomial, this is done as shown below:

$$k_3 t^3 + k_2 t^2 + k_1 t + k_0 \approx k_1 t + k_0 + \hat{r}_k, \tag{29}$$

where $\hat{r}$ is a remainder interval, which bounds the quadratic and cubic terms:

$$\hat{r}_k = [-|k_3|-|k_2|, |k_3|+|k_2|]. \tag{30}$$

We use this to conservatively express $a^2(t)+b^2(t)$ as:

$$a^2(t)+b^2(t) \approx (a_1 t + a_0 + \hat{r}_a)^2 + (b_1 t + b_0 + \hat{r}_b)^2. \tag{31}$$

The upper bound is given by:

$$a_1^2 + b_1^2 \max(0, a_0 a_1 + b_0 b_1) + a_0^2 + b_0^2 + \bar{r}_{a^2+b^2}, \tag{32}$$

where $\bar{r}_{a^2+b^2}$ is a linear function in the remainder intervals $\hat{r}_a$ and $\hat{r}_b$. Note that if a(t) and b(t) are linear in t, $\hat{r}_a = \hat{r}_b = 0$, which gives $\bar{r}_{a^2+b^2} = 0$, so Equation 32 is exact in that case. We use the backface test for motion blur (on Bernstein basis) to determine the backface status at the center of the lens as described above.

The final test is given by the conditions in Equation 34, where $a^2(t)+b^2(t)$ is bounded using Equation 32.

Figure 3:
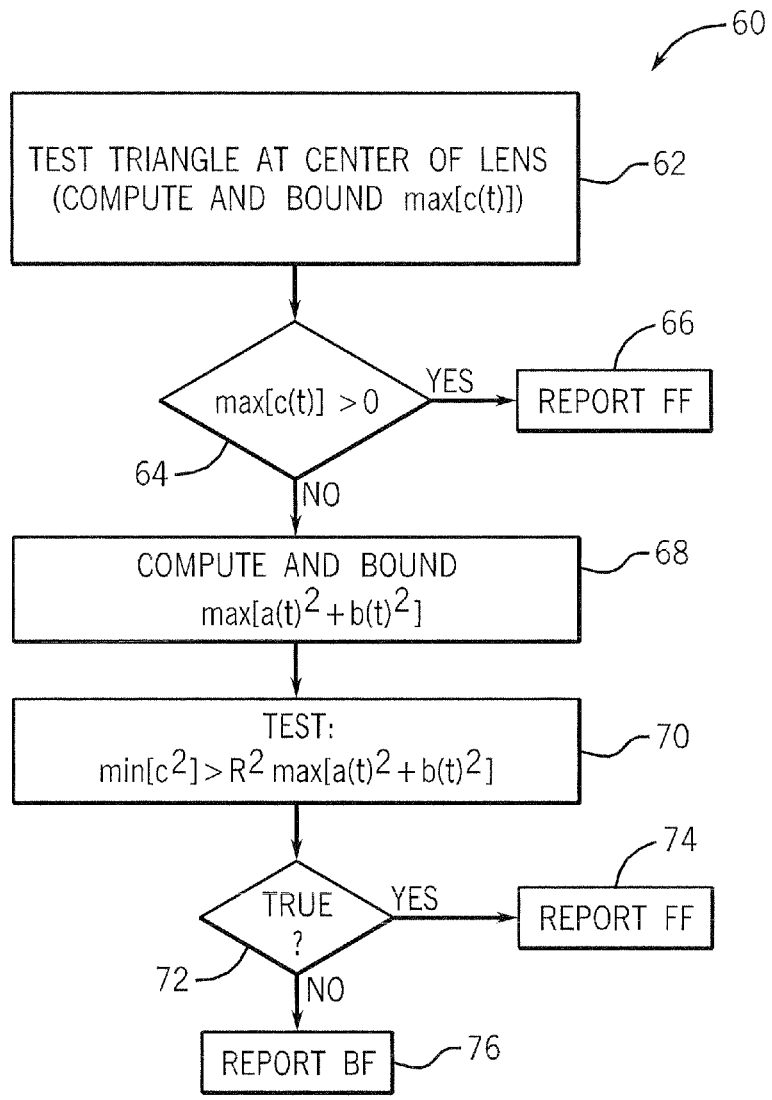
FIG. 3 is a flow chart for yet another embodiment.

Referring to FIG. 3, a sequence for implementing a backface test for both depth of field and motion blur begins by testing a triangle at the center of the lens, as indicated in block 62 of FIG. 3. This is done by computing and bounding the maximum of c(t). Next, a check at diamond 64 determines whether max[c(t)] is greater than zero. If it is, then the triangles are reported as front facing, as indicated in block 66.

Otherwise, at block 68, the $\max[a(t)^2 + b(t)^2]$ is computed and bounded, as indicated in block 68. Next, a test is done to determine if the minimum of $c^2$ is greater than $R^2 \max[a(t)^2 + b(t)^2]$, as indicated in block 70. If so, at diamond 72, the triangle is reported as front facing, as indicated in block 74 and, otherwise, it is reported as backfacing in block 76.

We will derive a backface culling test for motion blur where rasterization is done in screen space. For screen-space rasterization, a common backface test is given by the sign of the screen-space area of the triangle. A projective transform maps lines to lines, so the motion vectors are still lines after projection. However, the acceleration along the line is different due to perspective foreshortening. Let us define two edges of the projected triangle as:

$$e_1 = \frac{p_1(t)}{p_{1w}(t)} - \frac{p_0(t)}{p_{0w}(t)}, \tag{34}$$

$$e_2(t) = \frac{p_2(t)}{p_{2w}(t)} - \frac{p_0(t)}{p_{0w}(t)}.$$

Twice the signed area can now be expressed as:

$$A(t) = e_1(t) \times e_2(t), \tag{35}$$

$$= \frac{p_0}{p_{0w}} \times \frac{p_1}{p_{1w}} + \frac{p_1}{p_{1w}} \times \frac{p_2}{p_{2w}} + \frac{p_2}{p_{2w}} \times \frac{p_0}{p_{0w}},$$

-continued $$= \frac{p_{2w} p_0 \times p_1 + p_{0w} p_1 \times p_2 + p_{1w} p_2 \times p_0}{p_{0w} p_{1w} p_{2w}}$$

Recall that each vertex is a function of t (Equation 1), which results in that the backface test in screen space is a cubic rational function in t. The triangle moves in a plane, but the vertex positions are no longer linearly interpolated in t and the triangle can change facing at most three times.

Furthermore, the magnitude of the denominator $p_{0w} p_{1w} p_{2w}$ is irrelevant for the area test, so if we know the signs of the w components after clipping, the denominator can be skipped, resulting in a cubic polynomial, similar to the homogeneous case, as expected.

On the other hand, if we assume linear motion in screen space, the area function becomes a quadratic polynomial, so even in this case, the moving triangle can be backfacing at t=0 and t=1, and still be frontfacing somewhere in between.

Our techniques apply to real-time and offline rendering, and to both stochastic point sampling and analytical visibility methods. The rendering errors introduced by the previous technique can easily be detected in extreme cases, but in the majority of cases, these generate reasonable images, where the error is hard to detect.

Figure 4:
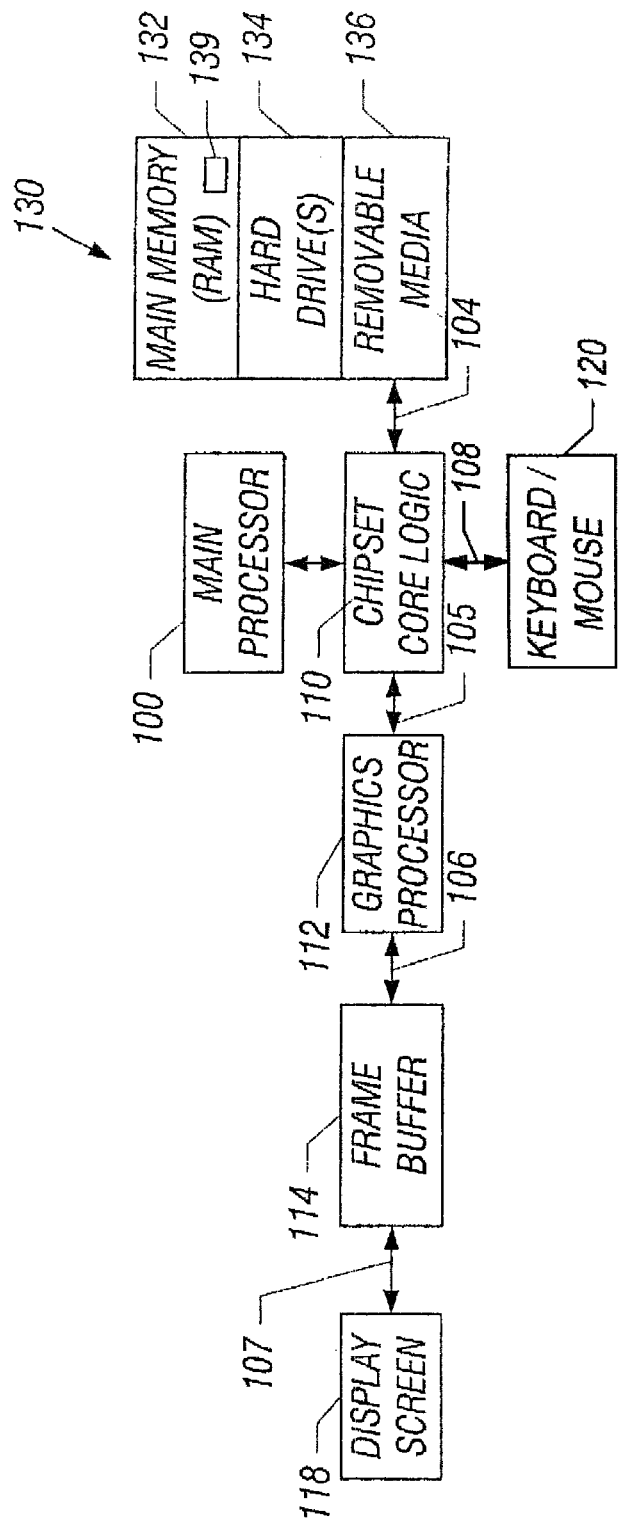
FIG. 4 is a schematic depiction for one embodiment.

The computer system 130, shown in FIG. 4, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIGS. 1-3 may be stored in a machine or computer readable medium, such as the memory 132 or the graphics processor 112, and may be executed by the processor 100 or the graphics processor 112 in one embodiment.

FIGS. 1-3 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 1-3.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining, using a computer, the sign of a determinant of vertices on a triangle undergoing motion blur and depth of field, including determining the sign of a determinant of vertices of a triangle where, for each vertex, the depth of field effect can be represented by a function of two lens coordinates u and v and the vertex motion represented by a function of time; and
    based on said sign, deciding whether to backface cull the triangle.

2. The method of claim 1 including determining the sign of a determinant of vertices on a triangle where each vertex moves according to a polynomial function in time.

3. The method of claim 2 including determining the sign of a determinant of vertices on a triangle where each vertex moves linearly in time.

4. The method of claim 2 including determining the sign of Bernstein coefficients and using the sign to determine if a triangle can be backface culled.

5. The method of claim 2 including determining if a moving triangle can change facing for single viewpoint.

6. The method of claim 1 including determining if a static triangle changes facing for any viewpoint within a lens.

7. The method of claim 1 including bounding the polynomial of an equation for the determinant using bounded arithmetic.

8. The method of claim 1 including approximating a lens with a square.

9. The method of claim 1 including determining whether a triangle can be culled by first checking backface status at the middle of a lens and only if the triangle is backfacing at the center of the lens, proceeding with the full backface test, otherwise reporting that the triangle is potentially visible.

10. A non-transitory computer readable medium storing instructions to enable a computer to:
    determine, using a computer, the sign of a determinant of vertices of a triangle undergoing motion blur and depth of field, including determining the sign of a determinant of vertices of a triangle where, for each vertex, the depth of field effect can be represented by a function of two lens coordinates u and v and the vertex motion represented by a function of time; and
    based on said sign, decide whether to backface cull the triangle.

11. The medium of claim 10 further storing instructions to determine the sign of a determinant of vertices of a triangle where each vertex moves according to the polynomial function in time.

12. The medium of claim 11 further storing instructions to determine the sign of a determinant of vertices of a triangle where each vertex moves linearly in time.

13. The medium of claim 11 further storing instructions to determine the sign of Bernstein coefficients and use the sign to determine if a triangle can be backface culled.

14. The medium of claim 11 further storing instructions to determine if a moving triangle can change facing for a single viewpoint.

15. The medium of claim 10 further storing instructions to determine if a static triangle changes facing for any viewpoint within a lens.

16. The medium of claim 10 further storing instructions to bound the polynomial of an equation for the determinant using bounded arithmetic.

17. The medium of claim 10 further storing instructions to approximate the lens with the square.

18. The medium of claim 10 further storing instructions to determine whether a triangle can be culled by first checking backface status at the middle of a lens and only if the triangle is backfacing at the center of the lens, proceed with the full backface test, otherwise report that the triangle is potentially visible.

19. An apparatus comprising:
    a processor to determine, using a computer, the sign of a determinant of vertices of a triangle undergoing motion blur and depth of field and, based on the sign, to decide whether to backface cull the triangle, said processor to determine the sign of a determinant of vertices of a triangle where, for each vertex, the depth of field effect can be represented by a function of two lens coordinates u and v and the vertex motion represented by a function of time; and
    a memory coupled to said processor.

20. The apparatus of claim 19 wherein said apparatus is a graphics processor.

21. The apparatus of claim 19, said processor to determine the sign of the determinant where each vertex moves according to a polynomial function in time.

22. The apparatus of claim 21, said processor to determine the sign of the determinant of vertices of a triangle where each vertex moves linearly in time.

23. The apparatus of claim 21, said processor to determine the sign of Bernstein coefficients and use the sign to determine if a triangle can be backface culled.

24. The apparatus of claim 21, said processor to determine if a moving triangle can change facing for a single viewpoint.

25. The apparatus of claim 19, said processor to determine if a static triangle changes facing for any viewpoint within a lens.

26. The apparatus of claim 19, said processor to bound the polynomial of an equation for the determinant using bounded arithmetic.

* * * * *